United States Patent
Kishikawa

(10) Patent No.: US 11,927,470 B2
(45) Date of Patent: Mar. 12, 2024

(54) COMBINATION WEIGHING APPARATUS WITH DISCHARGE CHUTE INCLUDING SLIDE SURFACE

(71) Applicant: Ishida Co., Ltd., Kyoto (JP)

(72) Inventor: Mikio Kishikawa, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 246 days.

(21) Appl. No.: 17/511,666

(22) Filed: Oct. 27, 2021

(65) Prior Publication Data

US 2022/0146301 A1 May 12, 2022

(30) Foreign Application Priority Data

Nov. 12, 2020 (JP) .................................. 2020-188747

(51) Int. Cl.
*G01G 19/387* (2006.01)
*B65G 11/16* (2006.01)

(52) U.S. Cl.
CPC ......... *G01G 19/387* (2013.01); *B65G 11/163* (2013.01); *B65G 11/166* (2013.01)

(58) Field of Classification Search
CPC .... G01G 13/003; G01G 13/022; G01G 13/16; G01G 13/18; G01G 19/387; G01G 19/393; B65G 11/163; B65G 11/166
(Continued)

(56) References Cited

U.S. PATENT DOCUMENTS 1,416,073 A * 5/1922 Steinbach ............ B65G 11/166
                                                                                  193/32
3,895,982 A * 7/1975 Persson ..................... B32B 3/30
                                                                                    428/167

(Continued)

FOREIGN PATENT DOCUMENTS

KR      10-2100468 B1    4/2020
WO     2014-067533 A1    5/2014
WO     2018/139127 A1    8/2018

OTHER PUBLICATIONS

The extended European search report issued by the European Patent Office dated Apr. 13, 2022, which corresponds to European Patent Application No. 21204979.5-1001 and is related to U.S. Appl. No. 17/511,666.

*Primary Examiner* — Randy W Gibson
(74) *Attorney, Agent, or Firm* — Studebaker & Brackett PC

(57) ABSTRACT

A combination weighing apparatus (1) according to one embodiment includes: a plurality of hoppers (4) to (6) that receives articles inputted from an outside, temporarily stores the articles, and discharges the stored articles downstream; a discharge chute (9) that receives the articles discharged from the hoppers and causes the articles to slide downstream; an acquisition unit (50) that acquires weight values of the articles stored in each hopper; and a control unit (30) that performs combination calculation on the basis of the weight values acquired by the acquisition unit and discharges the articles from a hopper determined by the combination calculation to the discharge chute. The discharge chute includes: a first slide surface (91) having a plurality of openings (91A); and a second slide surface (92) that covers a part of the opening and is disposed at a position on an inner side of the discharge chute with respect to the first slide surface. The second slide surface is formed continuously with the first slide surface on an upstream side, a left side, and a right side of the opening.

3 Claims, 4 Drawing Sheets

(58) Field of Classification Search
USPC .......................................... 177/25.18
See application file for complete search history.

(56) References Cited

U.S. PATENT DOCUMENTS

| | | | | |
|---|---|---|---|---|
| 4,478,300 A | * | 10/1984 | Mikami | ............... G01G 13/003 |
| | | | | 177/128 |
| 4,561,509 A | * | 12/1985 | Sakakibara | .......... G01G 19/393 |
| | | | | 177/25.18 |
| 4,566,549 A | * | 1/1986 | Oshima | .................. G01G 23/00 |
| | | | | 15/301 |
| 5,767,453 A | * | 6/1998 | Wakou | .................. G01G 19/393 |
| | | | | 177/25.18 |
| 2023/0069688 A1 | * | 3/2023 | Ichihashi | ............. G01G 13/003 |

* cited by examiner

FIG. 3
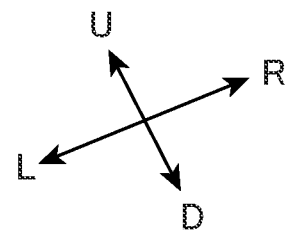
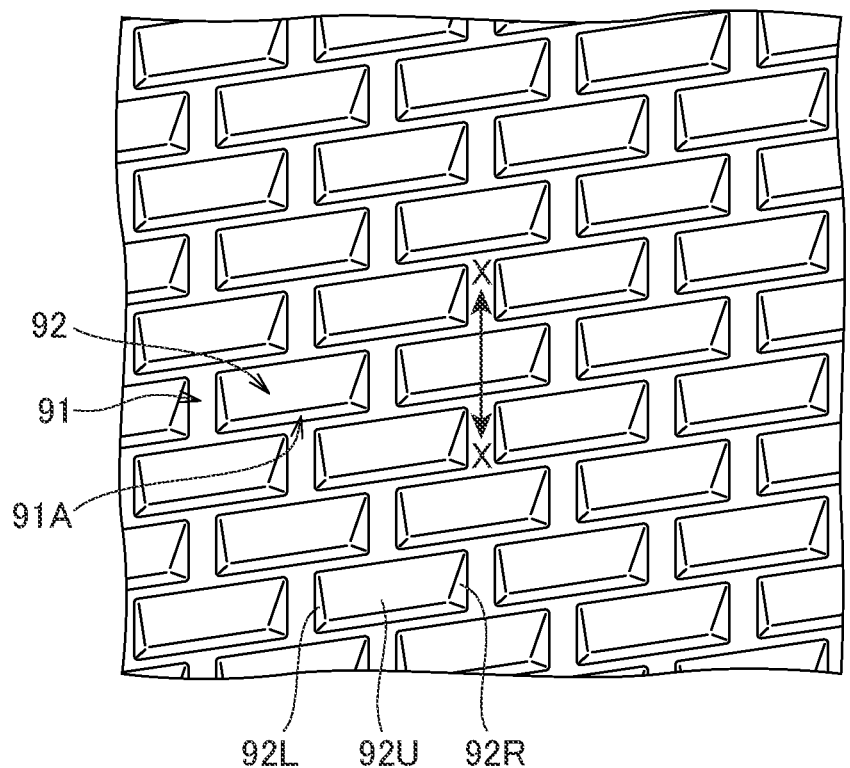

COMBINATION WEIGHING APPARATUS WITH DISCHARGE CHUTE INCLUDING SLIDE SURFACE

CROSS-REFERENCE TO RELATED APPLICATION

This application is based upon and claims the benefit of priority from Japanese Patent Application No. 2020-188747 filed on Nov. 12, 2020 in Japan, the entire contents of which are incorporated herein by reference.

TECHNICAL FIELD

The present invention relates to a combination weighing apparatus.

BACKGROUND ART

Conventionally, there has been known a technique of adopting a louver structure as a countermeasure against adhesion of articles in a discharge chute (see WO 2014/067533 A1, for example).

SUMMARY OF THE INVENTION

Technical Problem

However, processing is carried out on the discharge chute from both sides in the technique described above, and there is a problem that processing on a surface on which an article does not flow is only costly and has no effect on adhesion of articles.

Therefore, the present invention has been made in view of the above problems, and an object of the invention is to provide a combination weighing apparatus capable of effectively implementing a countermeasure against adhesion of articles at low cost.

Solution to Problem

A combination weighing apparatus according to an embodiment is summarized as including: a plurality of hoppers that receives articles inputted from an outside, temporarily stores the articles, and discharges the stored articles downstream; a discharge chute that receives the articles discharged from the hoppers and causes the articles to slide downstream; an acquisition unit that acquires weight values of the articles stored in each hopper; and a control unit that performs combination calculation on the basis of the weight values acquired by the acquisition unit and discharges the articles from a hopper determined by the combination calculation to the discharge chute, wherein the discharge chute includes: a first slide surface having a plurality of openings; and a second slide surface that covers a part of the opening and is disposed at a position on an inner side of the discharge chute with respect to the first slide surface, and the second slide surface is formed continuously with the first slide surface on an upstream side, a left side, and a right side of the opening.

A combination weighing apparatus according to an embodiment is summarized as including: a plurality of hoppers that receives articles inputted from an outside, temporarily stores the articles, and discharge the stored articles downstream; a discharge chute that receives the articles discharged from the hoppers and causes the articles to slide downstream; an acquisition unit that acquires weight values of the articles stored in each hopper; and a control unit that performs combination calculation on the basis of the weight values acquired by the acquisition unit and discharges the articles from a hopper determined by the combination calculation to the discharge chute, wherein the discharge chute has a plurality of protrusions on a front surface on which the articles is conveyed, and an opening directed from the front surface to a rear surface is formed at an end portion on a downstream side of each of the plurality of protrusions.

Advantageous Effects of Invention

According to the present invention, it is possible to provide a combination weighing apparatus capable of effectively implementing a countermeasure against adhesion of articles at low cost.

BRIEF DESCRIPTION OF DRAWINGS

FIG. 3 is an enlarged view of an area A in FIG. 2; and

DESCRIPTION OF EMBODIMENTS

Figure 1:
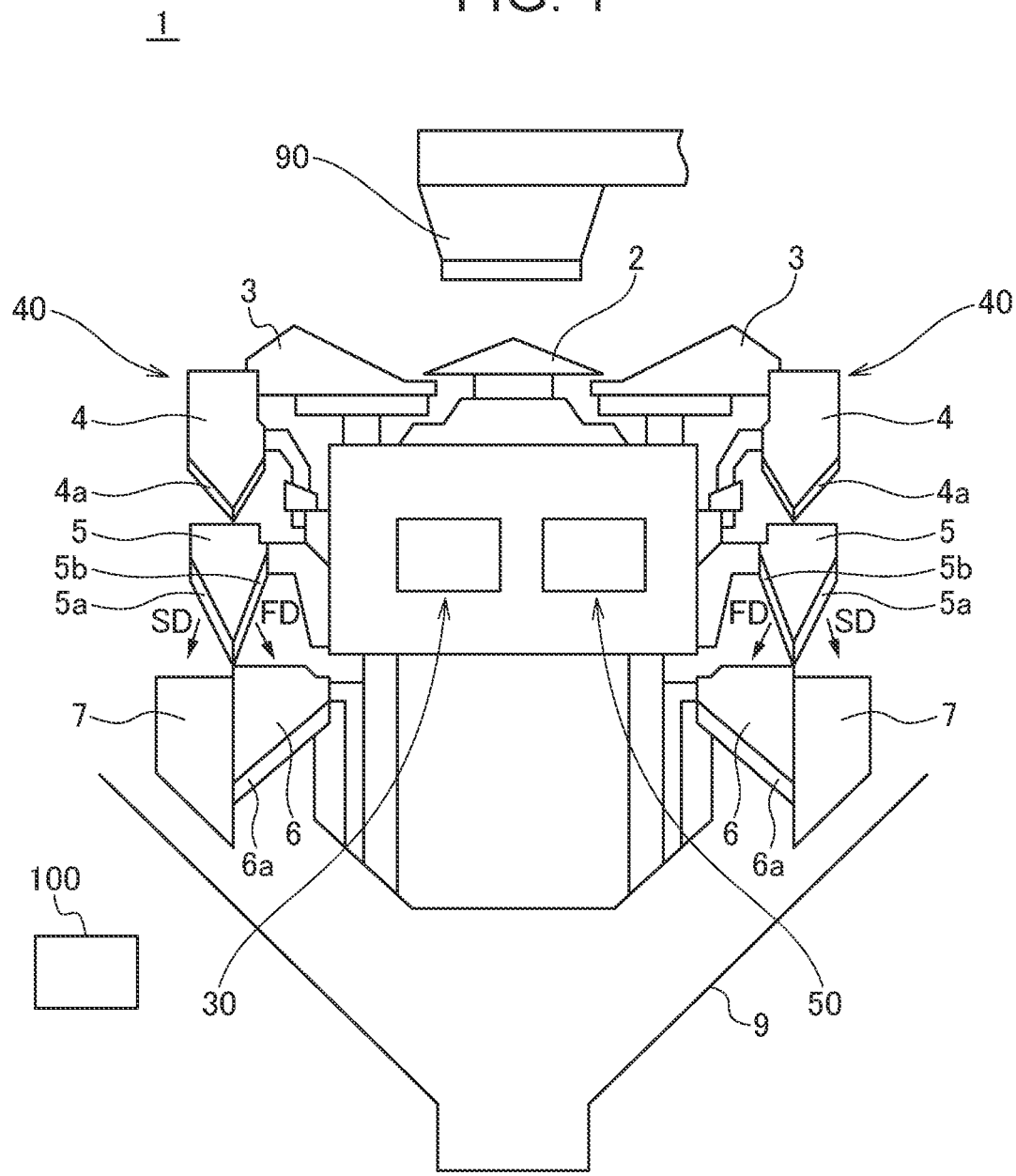
FIG. 1 is a diagram schematically illustrating a combination weighing apparatus 1 according to an embodiment.

Hereinafter, the present embodiment will be described in detail with reference to the attached drawings. In the following description of the drawings, the same or similar parts are denoted by the same or similar reference symbols. However, note that the drawings are schematic, and ratios of dimensions are different from actual ones. Therefore, specific dimensions and the like are determined in consideration of the following description. Moreover, there may be portions where dimensional relationships or proportions are different among the drawings. In this specification and the drawings, elements having substantially the same function and configuration are denoted by the same reference numerals to omit redundant description, and elements not directly related to the present invention are omitted.

First Embodiment

The following description will explain a combination weighing apparatus 1 according to a first embodiment of the present invention with reference to FIGS. 1 to 4.

Figure 2:
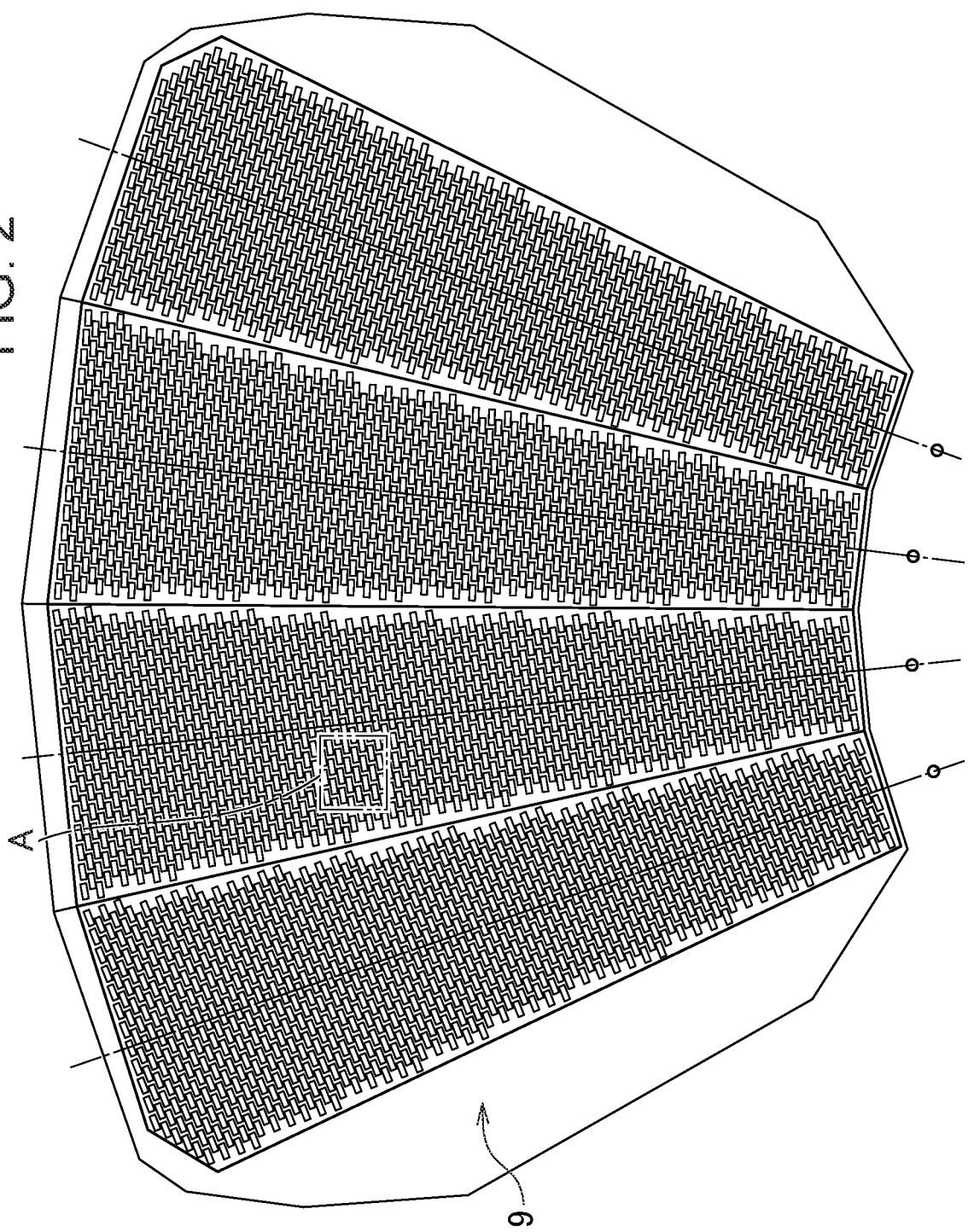
FIG. 2 is a diagram illustrating an example of a flow path surface on an inner side of a discharge chute 9 of the combination weighing apparatus 1 according to an embodiment.
Figure 4:
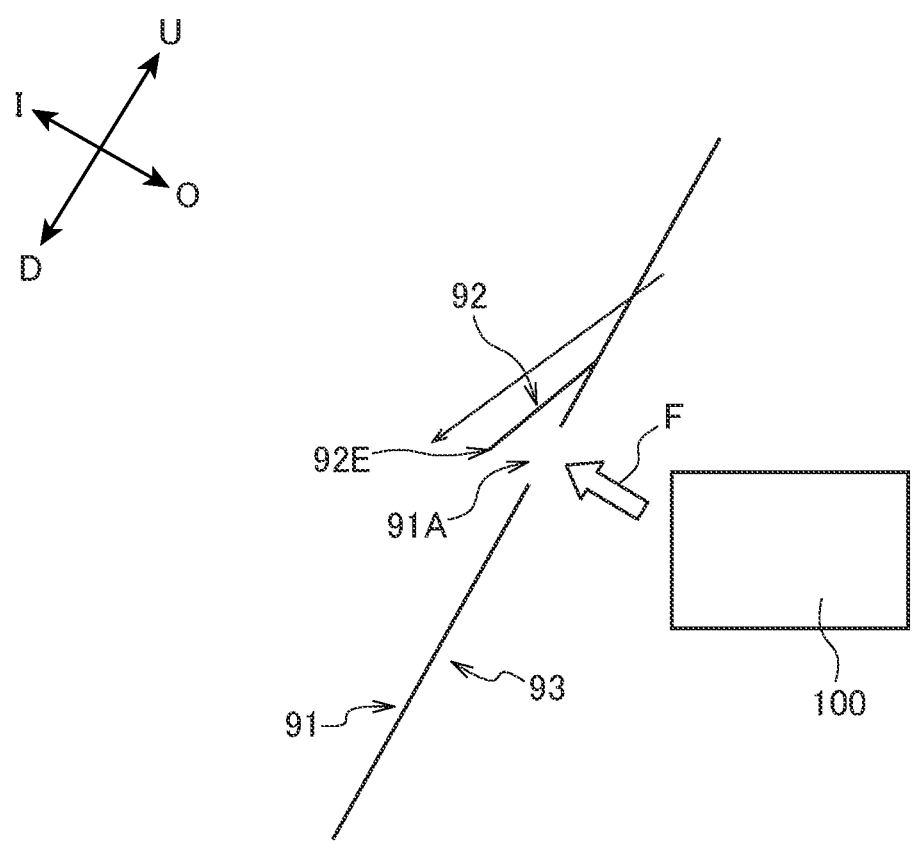
FIG. 4 is a cross-sectional view taken along line X-X in FIG. 3.

FIG. 1 is a diagram schematically illustrating the combination weighing apparatus 1 according to the present embodiment, FIG. 2 is a diagram illustrating an example of a flow path surface on an inner side of a discharge chute 9 of the combination weighing apparatus 1 according to the present embodiment, FIG. 3 is an enlarged view of an area A in FIG. 2, and FIG. 4 is a cross-sectional view taken along line X-X in FIG. 3.

As illustrated in FIG. 1, the combination weighing apparatus 1 according to the present embodiment includes a dispersion feeder 2, n heads 40, a discharge chute 9, an acquisition unit 50, and a control unit 30. The n is a natural number of 1 or more, and may be a natural number of 2 or more. The n is 14, for example.

The heads 40 are annularly arranged in top view. The heads 40 include a first head 40-1 to an n-th head 40-n. The first head 40-1 to the n-th head 40-n are arranged counter-clockwise in top view in order of numbers. Here, "annular" includes a toric shape, a polygonal ring shape, and the like. The present embodiment will explain the heads 40 that are annularly arranged as an example.

Each of the heads 40 includes a radiation feeder 3, a pool hopper 4, a weighing hopper 5, a booster hopper 6, and a sorting chute 7. Accordingly, the radiation feeders 3, the pool hoppers 4, the weighing hoppers 5, the booster hoppers 6, and the sorting chutes 7 are each also annularly arranged in top view.

The dispersion feeder 2 is a flat conical member. A supply conveyor 90 provided above the dispersion feeder 2 supplies articles to the dispersion feeder 2. In the dispersion feeder 2, the upper surface of the dispersion feeder 2 is vibrated by an electromagnet (not shown) provided below the dispersion feeder 2. The dispersion feeder 2 conveys the articles supplied to the upper surface in the radial direction while dispersing the articles in the circumferential direction, and supplies the articles to the respective radiation feeders 3.

Each radiation feeder 3 is a sheet-metal member formed by bending a stainless steel plate. The radiation feeders 3 are arranged radially along the periphery of the dispersion feeder 2.

In each radiation feeder 3, the conveyance surface is configured to be vibrated by an electromagnet (not shown) provided below the radiation feeder 3. Each radiation feeder 3 is configured to convey the articles outward with the vibration of the conveyance surface.

Moreover, each radiation feeder 3 is configured to supply the articles to the pool hopper 4 of the head 40 to which the radiation feeder itself belongs.

The conveying ability of the radiation feeder 3 can be adjusted by the vibration strength (vibration amplitude) and the vibration time on the conveyance surface. Accordingly, by adjusting the vibration strength and the vibration time, the weight values of the articles supplied to each pool hopper 4 can be kept within a predetermined range.

Each pool hopper 4 is disposed below the tip portion of the corresponding radiation feeder 3. Each pool hopper 4 is configured to temporarily hold or discharge the articles supplied from the radiation feeder 3.

The pool hopper 4 is provided with a gate 4a that opens and closes a bottom portion of the pool hopper 4, and a stepping motor (not shown) that drives the gate 4a.

The gate 4a is caused to perform an opening/closing operation by the control unit 30 controlling the stepping motor. The pool hopper 4 is configured to hold the articles inside the pool hopper 4 in a state where the gate 4a is close, and discharge the articles to the weighing hopper 5 of the head 40 to which the pool hopper itself belongs in a state where the gate 4a is open.

The weighing hopper 5 is configured to temporarily receive the articles so as to weigh the articles, and sort and discharge the weighed articles in one of the first direction FD or the second direction SD.

Each weighing hopper 5 is disposed immediately below the pool hopper 4 of the head 40 to which the weighing hopper itself belongs. The weighing hopper 5 is configured to hold the articles supplied from the pool hopper 4, and weigh the weight values of such articles.

The weighing hopper 5 is provided with gates 5a and 5b that open and close a bottom portion of the weighing hopper 5, and a stepping motor (not shown) that drives the gates 5a and 5b.

The weighing hopper 5 is configured to hold the articles inside in a state where both the gates 5a and 5b are close. Such a state is a state where the weighing hopper 5 temporarily receives articles.

The weighing hopper 5 is configured to sort and discharge the weighed articles in one of the first direction FD or the second direction SD by opening one of the gates 5a or 5b.

The weighing hopper 5 is configured to sort and discharge the articles in the first direction FD and discharge the articles to the booster hopper 6 of the head 40 to which the weighing hopper itself belongs, in a state where the gate 5b is open.

On the other hand, the weighing hopper 5 is configured to sort and discharge the articles in the second direction SD and discharge the articles to the sorting chute 7 of the head 40 to which the weighing hopper itself belongs, in a state where the gate 5a is open.

The booster hopper 6 is configured to temporarily receive the articles discharged in the first direction FD, and discharge the received articles downstream. Each booster hopper 6 is disposed below a position close to the center of the combination weighing apparatus 1 in the weighing hopper 5 of the head 40 to which the booster hopper itself belongs.

The booster hopper 6 is configured to temporarily hold or discharge the articles supplied from the weighing hopper 5.

The booster hopper 6 has a gate 6a that can open and close. Specifically, the booster hopper 6 is provided with a gate 6a that opens and closes a bottom portion of the booster hopper 6.

The booster hopper 6 is configured to hold the articles inside in a state where the gate 6a is close. This state is a state where the booster hopper 6 temporarily receives the articles.

On the other hand, the booster hopper 6 is configured to discharge the articles to the discharge chute 9 in a state where the gate 6a is open.

Note that the booster hopper 6 may be provided with a weighing sensor, so that the weight values of the articles stored in the booster hopper 6 can be weighed.

Here, the weighing hoppers 5 and the booster hoppers 6 constitute a plurality of hoppers that receive the articles inputted from the outside, temporarily store the articles, and then discharge the articles downstream.

The sorting chute 7 is configured to discharge the articles discharged in the second direction SD downstream. Each sorting chute 7 is disposed below a position close to the outer side of the combination weighing apparatus 1 in the weighing hopper 5 of the head 40 to which the sorting chute itself belongs.

The position of the sorting chute 7 is switched by a drive unit. The sorting chute 7 is configured to discharge the articles discharged in the second direction SD to the discharge chute 9 at the first position, and is configured to discharge the articles discharged in the second direction SD to the outer side (outside the system) of the discharge chute 9 at the second position.

In the discharge chute 9, the articles discharged from the booster hoppers 6 and the sorting chutes 7 slide down. That is, the discharge chute 9 is configured to discharge such articles downstream.

The discharge chute 9 is configured to collect the articles discharged from the weighing hopper 5 and the booster hopper 6 determined by combination calculation by the control unit 30 to be described later to one place and discharge the articles downward. The articles discharged from the discharge chute 9 are supplied to a subsequent packaging device or the like.

That is, the discharge chute 9 is configured to receive the articles discharged from the weighing hopper 5 and the booster hopper 6 described above and cause the articles to slide downstream.

The acquisition unit 50 is configured to acquire the weight values of the articles stored in each weighing hopper 5 and each booster hopper 6.

Specifically, the acquisition unit 50 may be configured to acquire the weight values measured by the weighing sensor of the weighing hopper 5 as the weight values of the articles stored in the weighing hopper 5.

Moreover, the acquisition unit 50 may be configured to acquire the weight values weighed by the weighing sensor in a case where the booster hopper 6 is provided with a weighing sensor, and acquire the weight values of the articles stored in the weighing hopper 5 acquired immediately before the weighing hopper 5 opens the gate 5b to sort and discharge the articles in the first direction FD as the weight values of the articles stored in the booster hopper 6 in a case where the booster hopper 6 is not provided with a weighing sensor.

The control unit 30 is configured to perform combination calculation on the basis of the weight values of the articles acquired by the acquisition unit 50 and discharge the articles from the weighing hopper 5 and the booster hopper 6 determined by the combination calculation to the discharge chute 9.

The following description will explain an example of the flow path surface on the inner side I of the discharge chute 9 of the combination weighing apparatus 1 according to the present embodiment with reference to FIGS. 2 to 4.

FIG. 2 illustrates the discharge chute 9 in a state of being developed such that the flow path surface on the inner side I faces upward. As illustrated in FIG. 2, the entire surface of the flow path surface on the inner side I of the discharge chute 9 is subjected to the louver processing.

Although the present embodiment will hereinafter explain a case where the louver processing is carried out on the flow path surface on the inner side I of the discharge chute 9 as an example, the present invention is not limited to such a case, and can be applied to a case where the louver processing is carried out on an any surface (flow path surface) on which an article slides down by its own weight, such as the inner side I of the dispersion feeder 2, the radiation feeders 3, the pool hoppers 4 (gates 4a), the weighing hoppers 5 (gates 5a and 5b), the booster hoppers 6 (gates 6a), the sorting chutes 7, or the like.

As illustrated in FIG. 3, the discharge chute 9 has a first slide surface 91 and second slide surfaces 92.

Here, as illustrated in FIGS. 3 and 4, the first slide surface 91 has a plurality of openings 91A.

Moreover, as illustrated in FIG. 4, each second slide surface 92 is configured to cover a part of an opening 91A. Moreover, as illustrated in FIG. 4, each second slide surface 92 is disposed at a position on the inner side I of the discharge chute 9 with respect to the first slide surface 91.

Moreover, as illustrated in FIG. 3, each second slide surface 92 is formed continuously with the first slide surface 91 on the upstream side U, the left side L, and the right side R of an opening 91A.

Specifically, as illustrated in FIG. 3, each second slide surface 92 has a left flat surface 92L, a right flat surface 92R, and an upper flat surface 92U.

Here, as illustrated in FIG. 3, each left flat surface 92L is formed so as to rise from the first slide surface 91 toward the inner side I on the left side L of an opening 91A.

Moreover, as illustrated in FIG. 3, each right flat surface 92R is formed so as to rise from the first slide surface 91 toward the inner side I on the right side R of an opening 91A.

Furthermore, as illustrated in FIG. 3, each upper flat surface 92U is formed to connect a left flat surface 92L with a right flat surface 92R.

On the flow path surface on the inner side I of such a discharge chute 9, the articles slide down from the upper side U to the lower side D along the first slide surface 91 and the upper flat surfaces 92U of the second slide surfaces 92 by their own weight as illustrated in FIG. 4.

In other words, as illustrated in FIG. 3, the discharge chute 9 has a plurality of protrusions 92 on the front surface 91 on which articles are conveyed, and openings 91A directed from such a front surface 91 toward a rear surface 93 are formed at end portions 92E on the downstream side of the plurality of protrusions 92.

According to the configuration described above that is provided with the second slide surfaces (protrusions) 92 each constituted by a left flat surface 92L, a right flat surface 92R, and an upper flat surface 92U, it is possible to decrease the contact area between an article (an object to be weighed) having high adhesion and the flow path surface of the discharge chute 9, to reduce the adhesion of the article, and to reduce the weighing error.

Moreover, according to the configuration described above that is provided with the openings 91A in the first slide surface (front surface) 91, air can enter from such openings 91A, and the adhesion of an article can be reduced.

Furthermore, since each second slide surface 92 is provided with a left flat surface 92L and a right flat surface 92R, it is possible to reduce a situation in which moisture contained in the article leaks to the outer side O of the discharge chute 9.

Here, as illustrated in FIG. 1, the combination weighing apparatus 1 according to the present embodiment may further have a jet unit 100.

As illustrated in FIG. 4, the jet unit 100 is configured to jet air from the outer side O toward the inner side I of the discharge chute 9 in the openings 91A.

According to such a configuration, the air jetted by the jet unit 100 can further reduce the adhesion of the articles.

According to the combination weighing apparatus 1 of the present embodiment, it is possible to effectively implement a countermeasure against adhesion of articles at low cost.

Although the present invention is explained in detail using the above-mentioned embodiments, it will be apparent to those skilled in the art that the present invention is not limited to the embodiments described herein. The present invention can be implemented as modifications and changes without departing from the spirit and scope of the present invention defined by the description of the claims. Accordingly, the description of the present specification is for the purpose of illustration and is not intended to limit the present invention in any way.

What is claimed is:

1. A combination weighing apparatus comprising:
   a plurality of hoppers that receives articles inputted from an outside, temporarily stores the articles, and discharges the stored articles downstream;
   a discharge chute that receives the articles discharged from the hoppers and causes the articles to slide downstream;
   an acquisition unit that acquires weight values of the articles stored in each hopper; and
   a control unit that performs combination calculation on the basis of the weight values acquired by the acquisition unit and discharges the articles from a hopper determined by the combination calculation to the discharge chute, wherein
the discharge chute includes:
  a first slide surface having a plurality of openings; and
  a plurality of second slide surfaces, each of the plurality of second slide surfaces covers a part of a corresponding one of the plurality of openings and is disposed at a position on an inner side of the discharge chute with respect to the first slide surface,
each of the plurality of second slide surfaces is formed continuously with the first slide surface on an upstream side, a left side, and a right side of each of the plurality of openings, and
each second slide surface of the plurality of second slide surfaces includes:
  a left flat surface rising from the first slide surface toward the inner side on a left side of the corresponding one of the plurality of openings;
  a right flat surface rising from the first slide surface toward the inner side on a right side of the corresponding one of the plurality of openings; and
  an upper flat surface that connects the left flat surface with the right flat surface.

2. The combination weighing apparatus according to claim 1, further comprising a jet unit that jets air from an outer side toward the inner side of the discharge chute in the plurality of openings.

3. A combination weighing apparatus comprising:
a plurality of hoppers that receives articles inputted from an outside, temporarily stores the articles, and discharge the stored articles downstream;
a discharge chute that receives the articles discharged from the hoppers and causes the articles to slide downstream;
an acquisition unit that acquires weight values of the articles stored in each hopper; and
a control unit that performs combination calculation on the basis of the weight values acquired by the acquisition unit and discharges the articles from a hopper determined by the combination calculation to the discharge chute, wherein
the discharge chute has a plurality of protrusions on a front surface on which the articles is conveyed,
an opening directed from the front surface to a rear surface is formed at an end portion on a downstream side of each of the plurality of protrusions, and
each of the plurality of protrusions includes:
  a left flat surface rising from the front surface toward an inner side of the discharge chute on a left side of the opening;
  a right flat surface rising from the front surface toward the inner side on a right side of the opening; and
  an upper flat surface that connects the left flat surface with the right flat surface.

* * * * *